UNITED STATES PATENT OFFICE.

HEINRICH HOERLEIN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

ALKALI SALTS OF PHENYLETHYLBARBITURIC ACID.

1,051,586. Specification of Letters Patent. Patented Jan. 28, 1913.

No Drawing. Application filed September 11, 1912. Serial No. 719,772.

*To all whom it may concern:*

Be it known that I, HEINRICH HOERLEIN, doctor of philosophy, chemist, citizen of the German Empire, residing at Vohwinkel, near Elberfeld, Germany, have invented new and useful Improvements in Alkali Salts of Phenylethylbarbituric Acid, of which the following is a specification.

The present application which is a continued application from my Letters Patent No. 1025872, filed September 6, 1911, relates specifically to the alkali salts of the phenylethylbarbituric acid having most probably the formula:

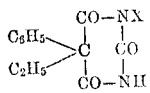

(X meaning an alkali metal such as Na, K, Li) which have proved to be valuable hypnotics; an average dose being from 0.2 to 0.4 gram.

My new bodies are distinguished by a good solubility in water and are highly valuable for subcutaneous injections. They are after being dried crystalline white powders soluble in water, soluble with difficulty in alcohol and insoluble in ether. The process for their production consists in treating the free acid with alkali metals or their hydroxids or carbonates.

In order to illustrate the new process more fully the following example is given, the parts being by weight:— 23 parts of sodium are dissolved in 350 parts of hot alcohol (free from water). To the resulting solution, at 50° C., 232 parts of phenylethylbarbituric acid are added. The sodium salt crystallizes from the cooling liquid. It is filtered off, washed with alcohol and dried *in vacuo* at 100° C. It is a white crystalline powder soluble in water, soluble with difficulty in alcohol, and insoluble in ether.

I claim:—

1. The herein described alkali salts of phenylethylbarbituric acid being white crystalline powders soluble in water; soluble with difficulty in alcohol and insoluble in ether; being valuable hypnotics, substantially as described.

2. The herein described sodium salt of phenylethylbarbituric acid being a white crystalline powder soluble in water, soluble with difficulty in alcohol and insoluble in ether; being a valuable hypnotic, substantially as described.

In testimony whereof I have hereunto set my hand in the presence of two subscribing witnesses.

HEINRICH HOERLEIN. [L. S.]

Witnesses:
 HELEN NUFER,
 ALBERT NUFER.